United States Patent
Youssef

(10) Patent No.: US 6,305,411 B1
(45) Date of Patent: Oct. 23, 2001

(54) NORMALLY-OPEN BACKWATER VALVE

(75) Inventor: Younes Youssef, Montreal (CA)

(73) Assignee: Ipex Inc. (CA)

( * ) Notice: Subject to any disclaimer, the term of this patent is extended or adjusted under 35 U.S.C. 154(b) by 0 days.

(21) Appl. No.: 09/693,879

(22) Filed: Oct. 23, 2000

(51) Int. Cl.[7] ............. F16K 31/22; F16K 31/24; F16K 31/30

(52) U.S. Cl. ............. 137/447; 73/322.5; 137/448; 405/96

(58) Field of Search ............. 137/397, 398, 137/409, 423, 425, 445, 447, 448; 4/393, 394, 395, 441, 442, 669, 679, 687, 688; 405/96, 97; 73/306, 322.5

(56) References Cited

U.S. PATENT DOCUMENTS

| | | | |
|---|---|---|---|
| 747,769 | * 12/1903 | Richards | 137/447 |
| 1,130,097 | * 3/1915 | Meikle | 405/97 |
| 1,633,165 | * 6/1927 | Davis | 137/447 |
| 1,864,443 | * 6/1932 | Khun | 137/448 |
| 1,969,427 | * 8/1934 | Sander | 137/448 |
| 1,969,964 | * 8/1934 | Brown | 137/447 |
| 2,290,246 | * 7/1942 | Murphy | 137/447 |
| 2,695,072 | * 11/1954 | Hauslein | 137/448 |
| 2,786,542 | 3/1957 | Orfei et al. | 137/445 |
| 2,882,919 | * 4/1959 | Brown | 137/423 |
| 2,928,410 | * 3/1960 | Del Vecchio | 137/448 |
| 3,079,942 | * 3/1963 | Nelson | 137/447 |
| 4,503,881 | 3/1985 | Vecchio | 137/448 |
| 4,797,027 | * 1/1989 | Combes et al. | 405/96 |
| 4,877,352 | * 10/1989 | Tuttle et al. | 405/104 |
| 4,963,057 | * 10/1990 | Fournier | 405/93 |
| 5,406,972 | 4/1995 | Coscarella et al. | 137/448 |
| 5,462,075 | * 10/1995 | Persson | 137/448 |

* cited by examiner

Primary Examiner—George L. Walton
(74) Attorney, Agent, or Firm—Riches McKenzie & Herbert LLP

(57) ABSTRACT

A backwater valve (for preventing the flow of liquid in a reverse direction when water backs up in the valve) has a gate which sealingly engages the input opening to the valve chamber so as to prevent the flow of water out of or into the input opening. The gate is angularly moveable about a pivot point between a lower, closed position in which the input opening is closed by the gate and an upper, open position in which the input opening is open. Linked to the gate, but positioned angularly away from the gate, is a float. The float and the gate are linked such that gravity normally maintains the float in a lower position and the gate in the upper, open position but, when liquid backs up into the value, the float will float to an upper position thereby moving the gate into the lower, closed position thereby closing the input opening and preventing liquid from flowing out of the valve through the input opening.

20 Claims, 6 Drawing Sheets

NORMALLY-OPEN BACKWATER VALVE

FIELD OF THE INVENTION

This invention relates to a backwater valve, and particularly a normally-open backwater valve. A backwater valve is intended to prevent reverse flow of liquid.

BACKGROUND OF THE INVENTION

In the past, there have been many different types of backwater valves. For example. U.S. Pat. No. 4,503,881 disclosed an automatic counterbalanced sewer valve with a float closure. Also, U.S. Pat. No. 5,406,972 to Coscarella et al. disclosed a backwater valve with a float mechanism, as did U.S. Pat. No. 2,786,542 to Orfei et al.

SUMMARY OF THE INVENTION

It is an object of this invention to provide an alternative backwater valve. Accordingly, in one of its aspects, this invention resides in providing A backwater valve, comprising: a liquid-retaining chamber having a tops bottom, first end, second end and two opposed sides: an input opening in a lower region of the first end; an output opening in a lower region of the second end; a gate positioned within the chamber and having a gate-face which sealingly closes the input opening, wherein the gate is angularly movable in a direction of angular movement about a pivot point, wherein the pivot point is positioned within the chamber, wherein the gate-face is oriented parallel to the direction of angular movement, wherein the gate is angularly movable between a lower, closed position in which the input opening is closed by the gate-face and an upper, open position in which the input opening is open, and wherein when the gate is being opened the gate moves in a first angular direction and when the gate is being closed the gate moves in a second angular direction which is opposite to the first angular direction; a float positioned within the chamber and not attached to the chamber, and positioned angularly away from the gate about the pivot point and angularly movable about the pivot point in the same direction of angular movement as the gate between a float upper position and a float lower position such that when the gate moves in the first angular direction the float also moves in the first angular direction and when the gate moves in the second angular direction the float also moves in the second angular direction; and wherein the float and the gate are linked such that during normal operation gravity normally maintains the float in the float lower position and the gate in the upper, open position, and wherein when there is backup of liquid in the chamber the float floats without the float being attached to the chamber and moves in the second angular direction to the float upper position and the gate is moved in the second angular direction into the lower, closed position such that the gate-face sealingly closes the input opening.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
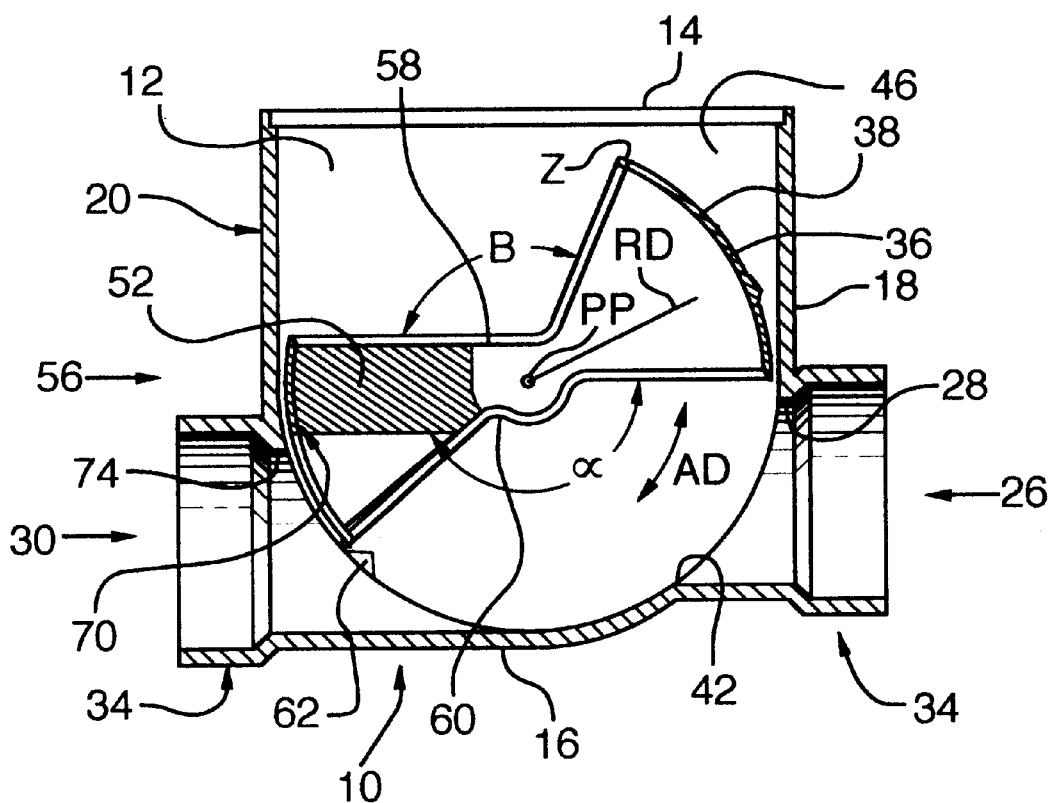
FIG. 1 is a cross-sectional view (looking along the line A—A in FIG. 3) of a preferred embodiment of the invention.

As shown in FIG. 1, one embodiment of the present invention relates to a backwater valve 10 comprising a liquid-retaining chamber 12 having a top 14, a bottom 16, first end 18, second end 20 and two opposed sides 22 and 24. There is an input opening 26 in a lower region 28 of the first end 18. Similarly, there is an output opening 30 in the lower region 32 of the second end 20.

Figure 3:
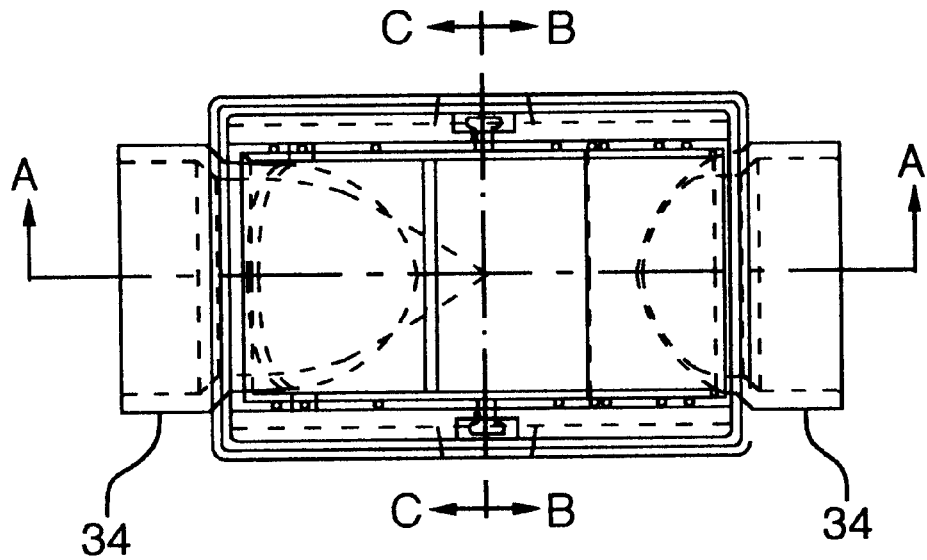
FIG. 3 is a top view of a preferred embodiment of the invention with the top removed.

Preferably, the input opening 26 and output opening 30 are circular in cross-section so as to correspond with the shape of a typical pipe (not shown). Also, as shown in FIGS. 1 and 3, there may be extensions 34 for receiving pipes.

Liquid, which is usually water, normally flows into the chamber 12 through input opening 26 and the liquid flows out of the chamber through output opening 30. However, there can sometimes be a back-up of liquid such that liquid flows into the chamber 12 through output opening 30. In that case, it is desired to close input opening 26 so that liquid in the chamber 12 does not flow out through input opening 26.

Preferably the chamber 12 is made from a plastic material.

Inside the chamber 12 is a gate 36 which has a gate-face 38. The gate-face 38 sealingly closes the input opening 26 as shown in FIG. 5.

In a preferred embodiment there is a gasket 40 either around the input opening 26 or on the gate-face 38 so as to form a seal between the gate-face 38 and the input opening 26 so as to prevent the flow of liquid from the input opening 26 into the chamber 12, or vice versa. Any suitable means may be used to create a suitable seal including direct contact between the gate-face 38 and the peripheral lip or edge 42 of the input opening 26.

Figure 5:
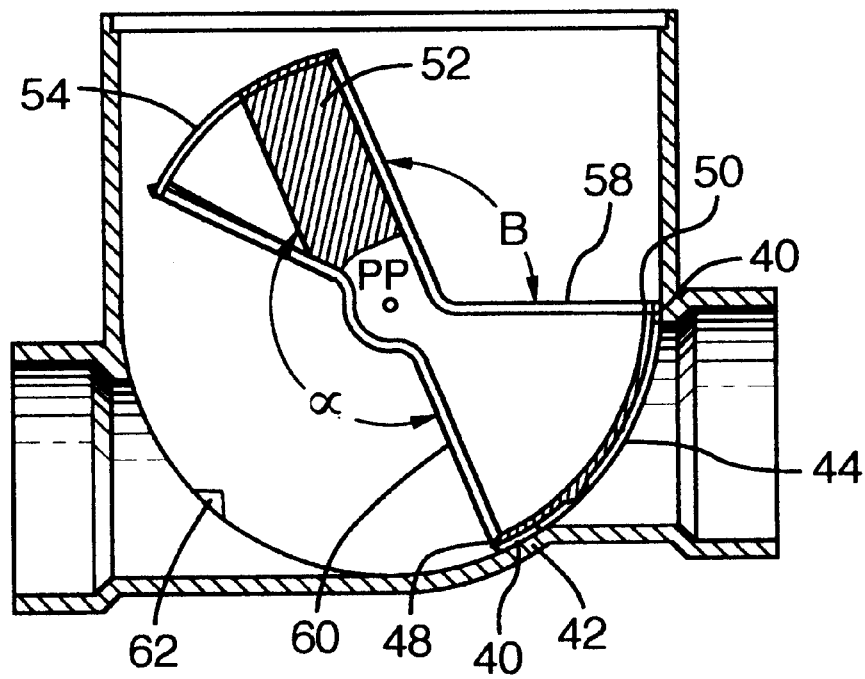
FIG. 5 is a cross-sectional view (looking along line A—A of FIG. 7) of a preferred embodiment of the invention.

The gate 36 is angularly moveable in a direction AD of angular movement about a pivot point PP between a lower, closed position 44 as shown in FIG. 5 in which the input opening 26 is closed by the gate-face 38 and an upper, open position 46 in which the input opening 26 is open as shown in FIG. 1.

The term "pivot point" also includes an axis of rotation. As shown in FIGS. 1 and 5, the pivot point PP is actually an axis of rotation. However in some embodiments, the gate 36 could actually pivot about a single point rather than rotate about an axis. Thus, the term "pivot point" is intended to include both a true pivot point and an axis of rotation. As seen in the preferred embodiment of FIGS. 2 and 6, the pivot point PP is a rotational axis having an axle 64.

A float 52 is positioned angularly away from the gate 36 about the pivot point PP (in other words, the float 52 is separated by some angle from the gate 36 measured about the pivot point PP).

Any suitable float mechanism may be used. For example, a separate element made from an inherently buoyant material could be used or an air-tight container (containing a fluid that is lighter than the liquid normally flowing through the backwater valve) could be positioned in the region of the float 52 so as to cause the float 52 to float or rise when liquid fills the chamber 12. Alternatively, for example, if sufficiently buoyant, the portions of the various connectors 58, 60, 66, 68 (as described below) on the float-side of the pivot point PP could act as the float 52.

The float 52 is angularly moveable about the pivot point PP between a float upper position 54 as shown in FIG. 5 and a float lower position 56 as shown in FIG. 1.

The float 52 and the gate 36 are linked such that gravity normally maintains the float 52 in the float lower position 56 as shown in FIG. 1. In this position, the gate 36 is in the upper, open position 46. Also, the float 52 and the gate 36 are linked such that when the chamber 12 is being filled with liquid the float 52 floats to the float upper position 54 as shown in FIG. 5. When the float 52 floats to the float upper position 54 the gate 36 is moved in the angular direction AD into the lower, closed position 44 such that the gate-face 38 sealingly closes the input opening 26.

Figure 11:
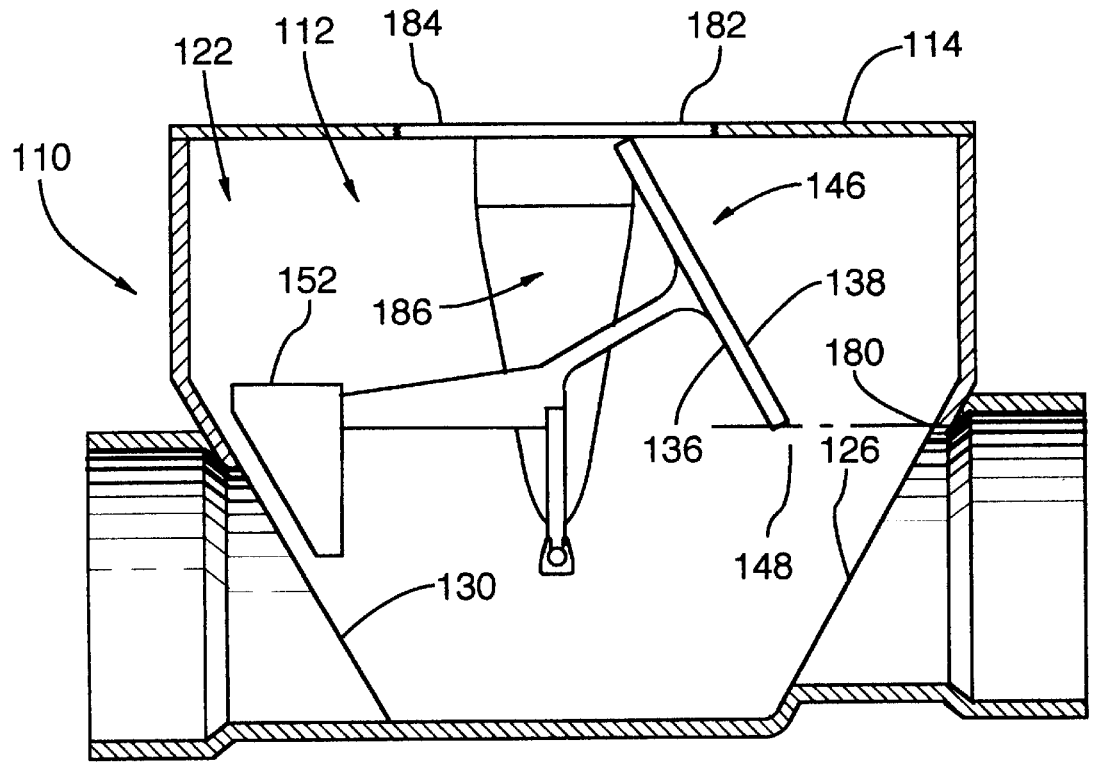
FIG. 11 is a cross-sectional view of a further preferred embodiment of the invention.

The gate-face 38 is oriented "parallel" to the direction AD of angular movement of the gate 36. In other words, the gate-face 38 is perpendicular to a line RD extending radially from the pivot point PP to the gate-face 38. In this sense, "parallel" includes embodiments where the gate-face 38 is arcuate in the direction of angular movement (such as shown in FIG. 1) and also includes embodiments where the gate-face 38 is flat or in a straight line in the direction of angular movement such as shown in FIG. 11. The concept of being oriented parallel to the direction of angular movement is intended to distinguish over those backwater valves wherein the gate-face is orient perpendicular to the direction of angular movement such as disclosed in U.S. Pat. No. 5,406,972 to Coscarella et al.

In a preferred embodiment, the gate-face may be somewhat "slightly off parallel", but is still substantially parallel to the direction AD of angular movement of the gate. In such an embodiment, the leading edge 48 of the gate-face 38 is positioned radially closer to the pivot point PP than is the trailing edge 50 of the gate-face 38. Thus, as the gate-face 38 sealingly closes the input opening 26 the gate-face 38 actually moves into the edge 42 of the input opening 26 rather than simply beside the edge 42, so as to create a better seal. Thus, the term "parallel" when used in this description and the claims is intended to mean and include embodiments where the gate-face 38 is truly parallel to the direction AD of angular movement of the gate 36 and also those embodiments where the gate-face 38 is oriented slightly off parallel (such as in FIG. 11) to the direction AD of angular movement of the gate 36 as described herein.

In a preferred embodiment, the gate-face 38 is arcuate in the direction AD of angular movement of the gate 36 as shown in FIGS. 1 and 5. Similarly, the shape of the input opening 26 corresponds in reverse to the arcuate shape of the gate-face 38 so as to sealingly receive the gate-face 38.

Figure 2:
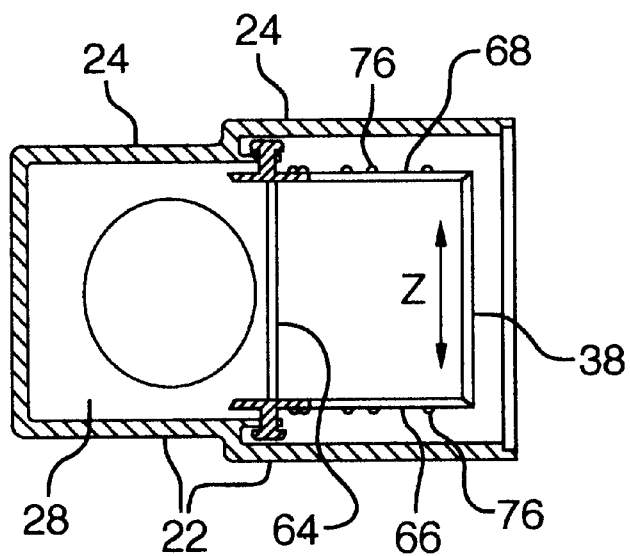
FIG. 2 is a cross-sectional view (looking along the line B—B in FIG. 3) of a preferred embodiment of the invention.
Figure 6:
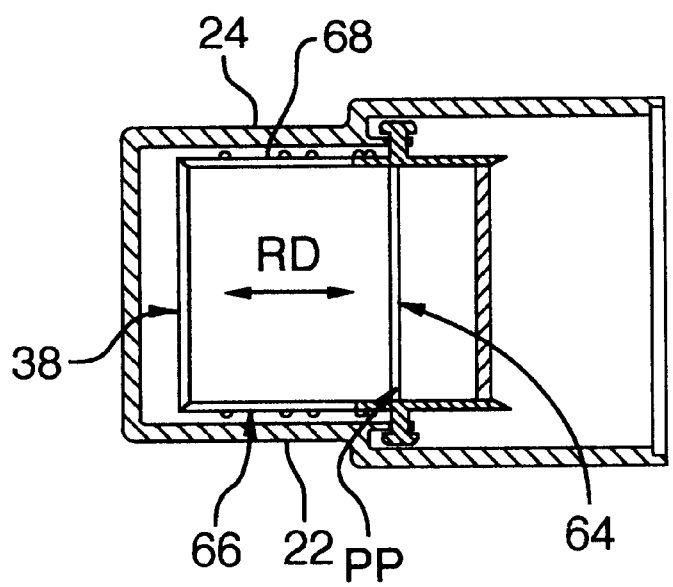
FIG. 6 is a cross-sectional view (looking along line B—B of FIG. 7) of a preferred embodiment of the invention.
Figure 7:
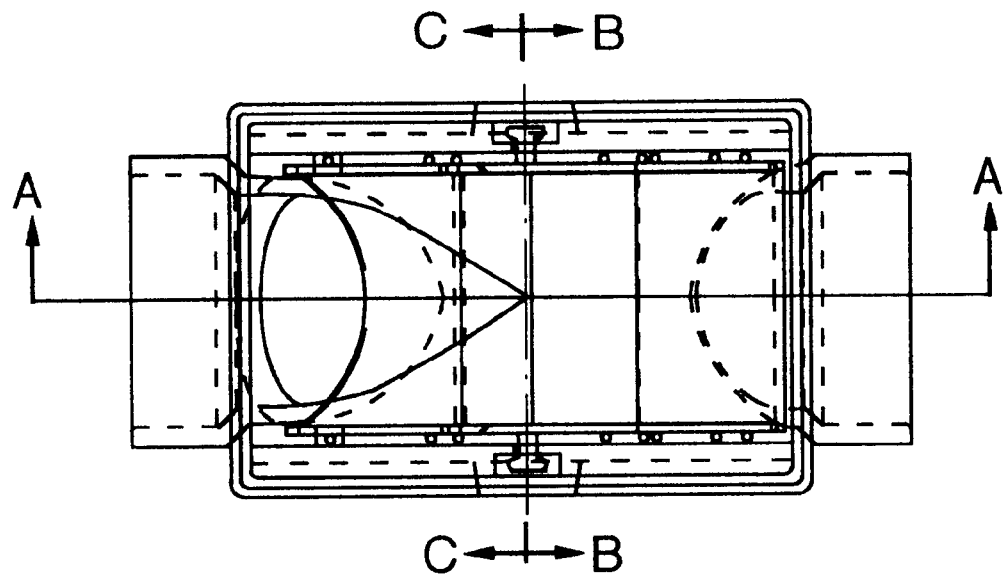
FIG. 7 is a top view of a preferred embodiment of the invention with the top removed.
Figure 8:
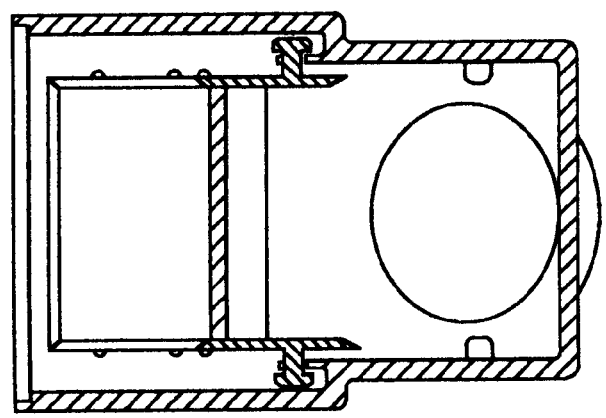
FIG. 8 is a cross-sectional view (looking along line C—C of FIG. 7) of a preferred embodiment of the invention.

In a preferred embodiment, as shown in FIGS. 2 and 6, the gate-face 38 is flat in a direction Z, wherein the direction Z is both perpendicular to the direction AD of angular movement and perpendicular to the radial direction RD from the pivot point PP to the gate-face 38. In FIG. 1, the direction Z is the orthogonal axis into the drawing. The Z direction may also be seen in FIG. 2.

Figure 9:
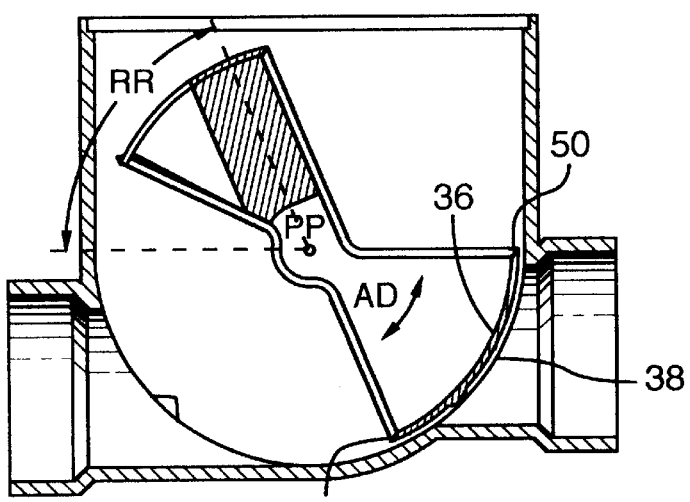
FIG. 9 is a cross-sectional view of a further preferred embodiment of the invention.

In a preferred embodiment, at least part of the float 52 is positioned diametrically opposite (through the pivot point PP) to the gate-face 38. In other words, with reference to FIG. 9, if a line were to extend from the leading edge 48 (which leads the gate-face 38 into the lower, closed position) of the gate-face 38 radially to the pivot point PP and then extend beyond the pivot point PP, and if a second line were to extend from the trailing edge 50 of the gate-face 38 radially through the pivot point PP and then extend beyond the pivot point PP, then the region RR between the two extensions of these lines beyond the pivot point PP would be considered to be diametrically opposite to the gate-face 38.

Figure 10:
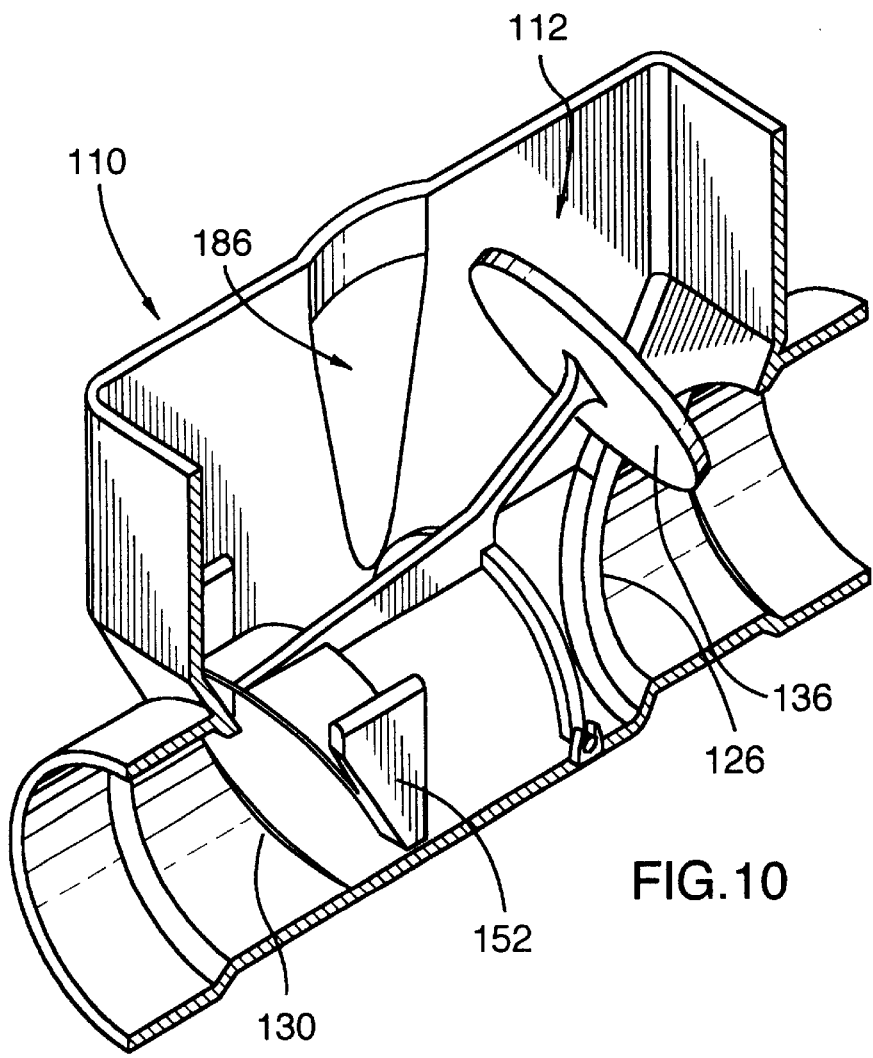
FIG. 10 is a perspective view through a cross-section of a further preferred embodiment of the invention.
Figure 12:
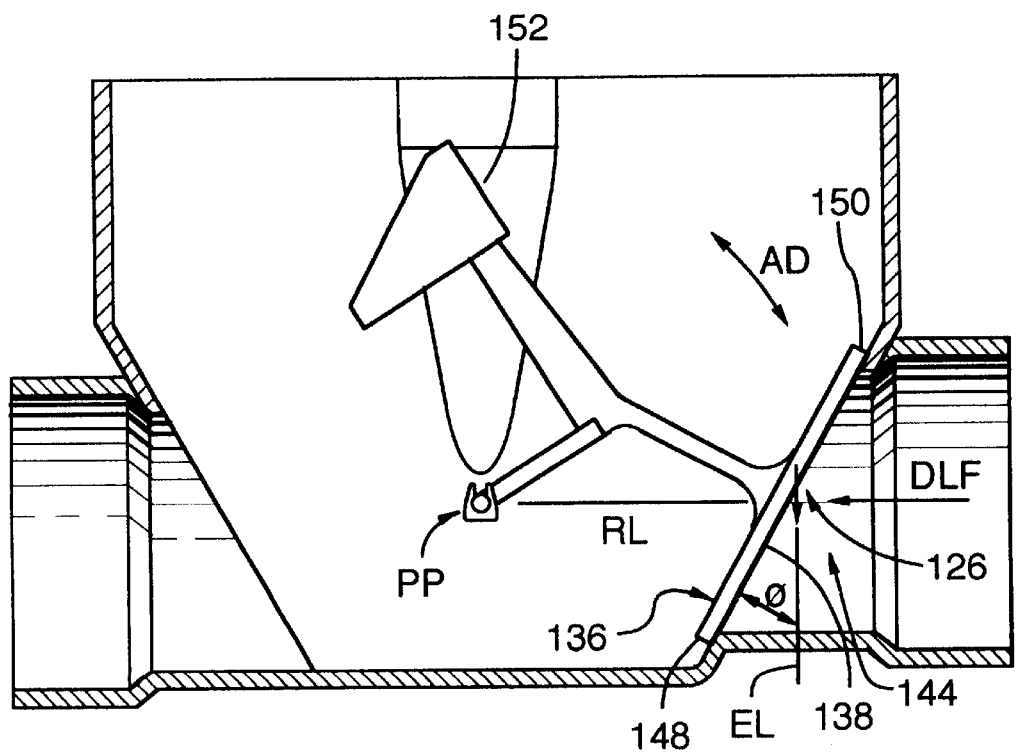
FIG. 12 is a cross-sectional view of a further preferred embodiment of the invention.

In a preferred embodiment of the invention, the float 52 is positioned 90 degrees or more in the angular direction AD ahead of the leading edge 48 of the gate-face 38 (angle α in FIG. 5) and 90 degrees or more in the angular direction AD behind the trailing edge 50 of the gate-face 38 (angle β in FIG. 5). In a more preferred embodiment, the angle α is more than 180 degrees (as shown in FIGS. 10 to 12).

Preferably the float 52 should be positioned as far away as possible in the radial direction from the pivot point PP so as to create as much force as possible when the float 52 floats as a result of the backup of liquid in the chamber 12. In this way there is as much force as possible to move the gate-face 38 into sealing engagement with the input opening 26.

Preferably there is a stop 62 on the chamber 12 which limits the downward movement of the float to a predetermined position. The stop 62 need not be a separate element, but may be some other element such as, for example, a wall or side of the retaining chamber 12.

Preferably, the gate 36 is rigidly connected to the float 52 such that when the float 52 moves angularly about the pivot point PP the gate 36 similarly moves angularly about the pivot point PP.

As shown in FIGS. 1 and 5, the float 52 and the gate 36 may be linked and connected through rigid connectors 58 and 60.

In a further preferred embodiment of the invention there are side connectors 66 and 68 as shown in FIG. 2 which link the gate 36 to the float 52.

Depending upon how the float 52 and the gate 36 are linked through connectors 58, 60, 66 and 68, various parameters, such as for example the mass of the respective connectors 58, 60, 66, 68, where the pivot point PP is positioned, the inherent buoyancy of the connectors 58, 60, 66, 68, the radial position of the float 52, and the gate 38, the angular position of the float 52 in relation to the gate 36 and the total buoyancy of the float 52, may be varied to achieve suitable angular movement of the gate 36 between the upper, open position 46 and the lower, closed position 44 and thereby achieve suitable sealing engagement between the gate-face 38 and the input opening 26 to close the input opening 26.

In one preferred embodiment, the float 52 and gate 36 are linked by rigid connectors 58 and 60 and side connectors 66 and 68 configured as shown in FIGS. 1 and 2. Preferably the pivot point PP is approximately equidistant between the gate-face 38 and the furthest radial part 70 of the float 52.

In another preferred embodiment the float 152 and gate 136 are linked as shown in FIGS. 10, 11 and 12.

Figure 4:
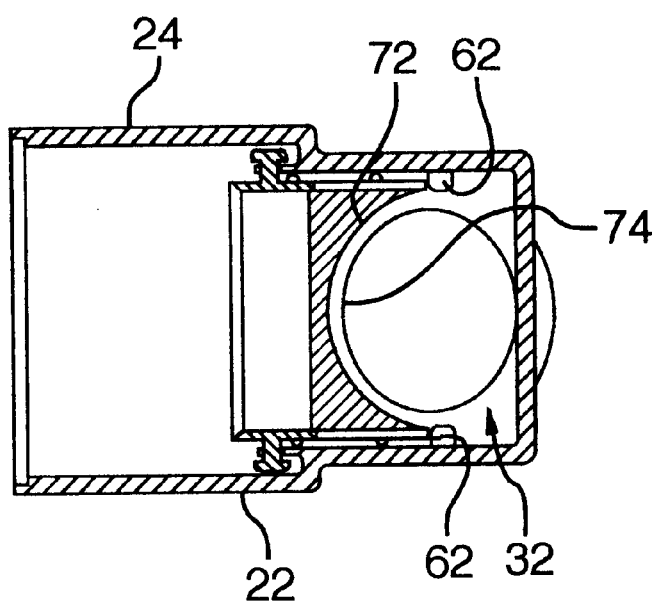
FIG. 4 is a cross-sectional view (looking along line C—C of FIG. 3) of a preferred embodiment of the invention.

In a preferred embodiment, the float 52 is shaped as shown in FIG. 4 so as to allow liquid to flow out through output opening 30, but at least a portion 72 of the float 52 is positioned lower than the upper-most part 74 of the output opening 30.

In a preferred embodiment of the invention, as shown in FIG. 6, the side connectors 66 and 68 are positioned very closely to side walls 22 and 24.

In a further preferred embodiment of the invention there are low-friction elements 76 extending from the side connectors 66 and 68 so as to guide and stablize the side connectors and allowing the side connector 66 and 68 to be positioned as close as possible to side walls 22 and 24 without causing undue friction during the angular movement of the float 52 and the gate 38.

In a further preferred embodiment, as shown in FIGS. 10, 11 and 12 (where elements corresponding to elements described above and shown in FIGS. 1 to 9 are indicated by a similar reference numeral, but beginning with the numeral "1"), the gate-face 138 is flat in the direction AD of angular movement. The gate-face 138 which is flat in the direction of direction AD of angular movement is also oriented "parallel" to the direction of angular movement AD of the gate 36 in the sense as defined above. Also, the leading edge 148 of the gate-face 138 is positioned radially closer to the pivot point PP than the trailing edge 150 of the gate-face 138 is to the pivot point. As described above, the leading edge 148 is that edge which leads the gate-face 138 into the lower, closed position 144 as shown in FIG. 12.

As shown in FIG. 12, there is a radial line RL extending radially from the pivot point PP to the gate face 138. At the point where the radial line RL intersects the gate-face 138 the direction AD of angular movement is perpendicular to the radial line RL. If the direction of angular movement at that particular point were extended as shown by the line EL in FIG. 12 it becomes apparent that the gate-face 138 is oriented at an angle Φ off-set from the direction of angular movement. Similarly, the input opening 126 is off-set at a corresponding angle Φ from a direction which is transverse to the direction of liquid flow DLF associated with the input opening. As long as the angle Φ is small, for example less than 45 degrees, or even smaller, the gate-face 138 can be considered "parallel" in the sense defined above.

In a preferred embodiment, the float 152 is positioned more that 180 degrees in the direction of angular movement ahead of the leading edge 148 of the gate-face 138.

The backwater valve 110 comprises a liquid-flow space LFS comprising the space through which liquid flows during normal operation from the input opening 126 to the output opening 130 and the input opening 126 has an uppermost point 180. In a further preferred embodiment, when the gate 136 is in the open position 146 as shown in FIG. 11, the liquid flow space LFS is substantially unobstructed by the gate 136 and the float 152, and the gate 136 is positioned such that the leading edge 148 of the gate-face 138 is at or above the uppermost point 180 of the input opening 126. It is to be understood that what is meant by the leading edge 148 being positioned at or above the uppermost point 180 of the input opening 126 is that for practical purposes the gate-face 138 does not obstruct to any practical degree the flow of liquid during normal operation when the gate 136 is in the open position 146. Thus, included within this meaning are embodiments where the leading edge 148 of the gate-face 138 may actually be below the uppermost point 126 of the input 180 of the input opening 126, but for practical purposes, the gate does not substantially obstruct the flow of liquid.

In a further preferred embodiment, the backwater valve 110 has a top 114 and there is an opening 182 in the top 114. Preferably the opening 182 is circular and there is a circular lid 184 which is threadably-receivable in the opening 182.

Preferably, the gate 136 and float 152 may be removed from or placed into the liquid retaining chamber 112 of the backwater valve 110 through the opening 182 in the top 114 of the backwater valve 110.

The elliptical portion 186 shown in the sidewall 122, and as particularly seen in FIG. 10, is required as part of a specific embodiment where the circular lid 184 has a diameter greater than the width of the chamber 112 and, therefore, the elliptical portions 186 extend the sidewalls 122 and 124 in the area of the lid 184 so as to accommodate the entirety of the lid 184.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A backwater valve, comprising:

a liquid-retaining chamber having a top, bottom, first end, second end and two opposed sides:

an input opening in a lower region of the first end;

an output opening in a lower region of the second end;

a gate positioned within the chamber and having a gate-face which sealingly closes the input opening, wherein the gate is angularly movable in a direction of angular movement about a pivot point, wherein the pivot point is positioned within the chamber, wherein the gate-face is oriented parallel to the direction of angular movement, wherein the gate is angularly movable between a lower, closed position in which the input opening is closed by the gate-face and an upper, open position in which the input opening is open, and wherein when the gate is being opened the gate moves in a first angular direction and when the gate is being closed the gate moves in a second angular direction which is opposite to the first angular direction;

a float positioned within the chamber and not attached to the chamber, and positioned angularly away from the gate about the pivot point and angularly movable about the pivot point in the same direction of angular movement as the gate between a float upper position and a float lower position such that when the gate moves in the first angular direction the float also moves in the first angular direction and when the gate moves in the second angular direction the float also moves in the second angular direction; and wherein the float and the gate are linked such that during normal operation gravity normally maintains the float in the float lower position and the gate in the upper, open position, and wherein when there is backup of liquid in the chamber the float floats without the float being attached to the chamber and moves in the second angular direction to the float upper position and the gate is moved in the second angular direction into the lower, closed position such that the gate-face sealingly closes the input opening.

2. A backwater valve as defined in claim 1 wherein the gate-face is flat in the direction of angular movement of the gate.

3. A backwater valve as defined in claim 1 wherein the gate-face is arcuate in the direction of angular movement of the gate.

4. A backwater valve as defined in claim 1 wherein the gate-face has a leading edge which leads the gate-face into the lower, closed position and a trailing edge and wherein the float is positioned more than 90 degrees in the direction of angular movement ahead of the leading edge of the gate-face and wherein the float is positioned in the direction of angular movement more than 90 degrees behind the trailing edge of the gate-face.

5. A backwater valve as defined in claim 1 wherein at least part of the float is positioned diametrically opposite through the pivot point to the gate-face.

6. A backwater valve as defined in claim 1 further comprising a stop which limits the movement of the float downwardly to a pre-determined position.

7. A backwater valve as defined in claim 1 wherein there is a direction which is both perpendicular to the direction of angular movement and perpendicular to a radial direction from the pivot point to the gate-face and wherein the gate-face is flat in the direction which is both perpendicular to the direction of angular movement and perpendicular to the radial direction from the pivot point to the gate-face.

8. A backwater valve as defined in claim 1 wherein the gate-face has a leading edge and a trailing edge, and wherein the leading edge of the gate-face is positioned radially closer to the pivot point than the trailing edge of the gate-face is to the pivot point.

9. A backwater valve as defined in claim 1 wherein the pivot point is an axis of rotation.

10. A backwater valve as defined in claim 1 wherein the gate is rigidly connected to the float.

11. A backwater valve as defined in claim 1 wherein the gate-face has a leading edge which leads the gate-face into the lower, closed position and a trailing edge and wherein the float is positioned more than 90 degrees in the direction of angular movement ahead of the leading edge of the gate-face and wherein the float is positioned in the direction of angular movement more than 90 degrees behind the trailing edge of the gate-face;

wherein the float is positioned diametrically opposite through the pivot point to the gate-face;

wherein the gate-face is flat in a direction which is both perpendicular to the direction of angular movement and perpendicular to the radial direction from the pivot point to the gate-face;

wherein the pivot point is an axis of rotation; and further comprising a stop which limits the movement of the float downwardly to a predetermined position.

12. A backwater valve as defined in claim 11 wherein the gate-face is arcuate in the direction of angular movement.

13. A backwater valve as defined in claim 11 wherein the gate-face is flat in the direction of angular movement of the gate.

14. A backwater valve as defined in claim 13 wherein the leading edge of the gate-face is positioned radially closer to the pivot point than the trailing edge of the gate-face is to the pivot point.

15. A backwater valve as defined in claim 1 wherein the gate-face has a leading edge which leads the gate-face into the lower, closed position and a trailing edge and wherein the float is positioned more than 180 degrees in the direction of angular movement ahead of the leading edge of the gate-face.

16. A backwater valve as defined in claim 1 wherein the gate-face is flat in the direction of angular movement of the gate.

17. A backwater valve as defined in claim 1 wherein there is a direction of liquid flow associated with the input opening and wherein the gate-face is oriented at an angle off-set from the direction of angular movement and the input opening is offset at a corresponding angle from a direction transverse to the direction of fluid flow associated with the input opening.

18. A backwater valve as defined in claim 1 wherein the gate-face has a leading edge which leads the gate-face into the lower, closed position and a trailing edge and wherein the float is positioned more than 180 degrees in the direction of angular movement ahead of the leading edge of the gate-face;

wherein the gate-face is flat in the direction of angular movement of the gate;

wherein the gate-face is flat in a direction that is both perpendicular to the direction of angular movement and perpendicular to a radial direction from the pivot point to the gate-face;

wherein the leading edge of the gate-face is positioned radially closer to the pivot point than the trailing edge of the gate-face is to the pivot point;

wherein the pivot point is an axis of rotation; and further comprising a stop which limits the movement of the float downwardly to a predetermined position.

19. A backwater valve as defined in claim 18 wherein the backwater valve further comprises a liquid-flow space comprising a space through which liquid flows during normal operation from the input opening to the output opening, and wherein the input opening has an uppermost point, and wherein, when the gate is in the open position, the liquid-flow space is substantially unobstructed by the gate and float, and the leading edge of the gate-face is positioned at or above the uppermost point of the input opening.

20. A backwater valve as defined in claim 19 wherein the gate and float are removable from, and placeable into, the liquid-retaining chamber of the backwater valve, and wherein the backwater valve further comprises a circular lid threadably-receivable in an opening in the top of the backwater valve, wherein the gate and float may be removed from or placed into the liquid-retaining chamber through the opening in the top of the backwater valve.

\* \* \* \* \*